US012762037B2

(12) United States Patent
Wang et al.

(10) Patent No.: US 12,762,037 B2

(45) Date of Patent: Oct. 13, 2026

(54) ENHANCED DISTRIBUTED TRACING

(71) Applicant: International Business Machines Corporation, Armonk, NY (US)

(72) Inventors: Yue Wang, Beijing (CN); Wei Wu, Beijing (CN); Xinpeng Liu, Austin, TX (US); Biao Chai, Beijing (CN); Liang Wang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 398 days.

(21) Appl. No.: 18/645,968

(22) Filed: Apr. 25, 2024

(65) Prior Publication Data

US 2025/0335329 A1 Oct. 30, 2025

(51) Int. Cl.
*G06F 11/34* (2006.01)

(52) U.S. Cl.
CPC ................................ *G06F 11/3495* (2013.01)

(58) Field of Classification Search
CPC ............... G06F 11/3495; G06F 11/302; G06F 11/3466; G06F 11/3476; G06F 11/3006
See application file for complete search history.

(56) References Cited

U.S. PATENT DOCUMENTS

| | | | | |
|---|---|---|---|---|
| 9,215,151 | B1 | 12/2015 | De Rosa et al. | |
| 9,274,919 | B2 | 3/2016 | Greifeneder et al. | |
| 9,600,503 | B2 | 3/2017 | Barykin et al. | |
| 11,200,138 | B1 | 12/2021 | Wu et al. | |
| 11,210,156 | B1 | 12/2021 | Liu et al. | |
| 2021/0149787 | A1* | 5/2021 | Nguyen | G06F 11/0757 |
| 2021/0399953 | A1* | 12/2021 | Arnold | G06F 11/3636 |
| 2023/0078122 | A1* | 3/2023 | Wilkins | H04L 41/0686 709/224 |
| 2025/0030699 | A1* | 1/2025 | Suresh Puthalath | H04L 63/108 |

(Continued)

OTHER PUBLICATIONS

Anderson et al., "Efficient Tracing and Performance Analysis for Large Distributed Systems," 2009 IEEE International Symposium on Modeling, Analysis & Simulation of Computer and Telecommunication Systems, 2009, pp. 1-10, IEEE, accessed Mar. 26, 2024, https://ieeexplore.ieee.org/document/5366158?section=abstract.

(Continued)

*Primary Examiner* — Sisley N Kim

(74) *Attorney, Agent, or Firm* — Yee & Associates, P.C.

(57) ABSTRACT

Enhanced distributed tracing is provided. A set of microservices in a sequence of microservices preceding a preselected microservice in the sequence of microservices are identified. Each tracing data sample received from the set of microservices preceding the preselected microservice in the sequence of microservices is identified. Each tracing data sample corresponding to a set of selected transactions received from the set of microservices preceding the preselected microservice in the sequence of microservices that was dropped during rate-limiting sampling performed by the preselected microservice is deleted based on analysis of a result of the rate-limiting sampling of the set of selected transactions received from the preselected microservice thereby retaining a subset of tracing data samples corresponding to the set of selected transactions collected during head-based sampling.

20 Claims, 8 Drawing Sheets

(56) References Cited

U.S. PATENT DOCUMENTS

2025/0315361 A1* 10/2025 Sankhe ............... G06F 11/3466

OTHER PUBLICATIONS

Author unknown, "Sampling," Jaeger, 2024, 3 pages, jaegertracing.io, accessed Mar. 26, 2024, https://www.jaegertracing.io/docs/1.52/sampling/.

Author unknown, "Transaction sampling," GitHub, 2022, 4 pages, github.com, accessed Mar. 26, 2024, https://github.com/elastic/apm-server/blob/7.15/docs/guide/trace-sampling.asciidoc.

Dai, "How to Design a Scalable Rate Limiting Algorithm with Kong API," Jan. 15, 2021, 17 pages, konghq.com, accessed Mar. 26, 2024, https://konghq.com/blog/engineering/how-to-design-a-scalable-rate-limiting-algorithm.

Liu et al., "JCallGraph: Tracing Microservices in Very Large Scale Container Cloud Platforms," Cloud Computing—CLOUD 2019: 12th International Conference, Held as Part of the Services Conference Federation, SCF 2019, Jun. 25-30, 2019, pp. 27-302, Springer, accessed Mar. 26, 2024, https://dl.acm.org/doi/abs/10.1007/978-3-030-23502-4_20.

Mertz et al., "Software Runtime Monitoring with Adaptive Sampling Rate to Collect Representative Samples of Execution Traces," Journal of Systems and Software, 2023, pp. 1-14, vol. 202, sciencedirect.com (ELSEVIER), accessed Mar. 26, 2024, https://doi.org/10.1016/j.jss.2023.111708.

* cited by examiner

ENHANCED DISTRIBUTED TRACING

BACKGROUND

The disclosure relates generally to distributed tracing and more specifically to enhanced distributed tracing.

Distributed tracing collects tracing data from microservice applications. Distributed tracing tracks how incoming transaction requests propagate through microservice applications and provides detailed near real-time performance insights (e.g., where time is spent, what is causing latency, and the like). Distributed tracing automatically analyzes all the microservice applications' tracing data to generate reports identifying performance degradations or bottlenecks and potential optimizations. A trace consists of a set of spans. Each span represents a single timed event within a trace, such as, for example, a remote procedure call. Distributed tracing can provide observability and insight into a multi-tier microservices architecture. For example, when chained microservice to microservice calls exist (e.g., from microservice A to microservice B to microservice C and so on), knowing whether the microservice calls were successful and the latency at each microservice would be beneficial.

Head-based sampling makes the sampling decision as early as possible, typically when a trace is generated. In other words, head-based sampling does not make the decision to sample or to drop a trace by inspecting the whole trace. Thus, head-based sampling reduces the volume of tracing data collected by avoiding the generation of traces that will not be used. By discarding unnecessary traces early, head-based sampling saves resources, such as, for example, processor, memory, and storage. However, head-based sampling cannot sample traces with errors because error information is not available when the traces are generated.

Tail-based sampling defers the sampling decision until the trace is complete. In other words, unlike head-based sampling, which decides at the beginning of a trace, tail-based sampling waits until the end of the trace. Thus, tail-based sampling provides more comprehensive information by, for example, providing sample traces with errors. However, tailed-based sampling can increase the volume of tracing data collected to an unmanageable size.

Rate-limiting sampling ensures that sampling does not exceed a predefined sampling rate limit. For example, if rate-limiting sampling is set at sampling 10 traces per second, then only 10 or less traces are sampled per second. Thus, rate-limiting sampling supports adjusted sampling rates, but the accuracy of rate-limiting sampling may be low.

SUMMARY

According to one illustrative embodiment, a computer-implemented method for enhanced distributed tracing is provided. One or more processors identify a set of microservices in a sequence of microservices preceding a preselected microservice in the sequence of microservices. The one or more processors identify each tracing data sample received from the set of microservices preceding the preselected microservice in the sequence of microservices. The one or more processors delete each tracing data sample corresponding to a set of selected transactions received from the set of microservices preceding the preselected microservice in the sequence of microservices that was dropped during rate-limiting sampling performed by the preselected microservice based on analysis of a result of the rate-limiting sampling of the set of selected transactions received from the preselected microservice thereby retaining a subset of tracing data samples corresponding to the set of selected transactions collected during head-based sampling. According to other illustrative embodiments, a computer system and computer program product for enhanced distributed tracing are provided.

DETAILED DESCRIPTION

Figure 1:
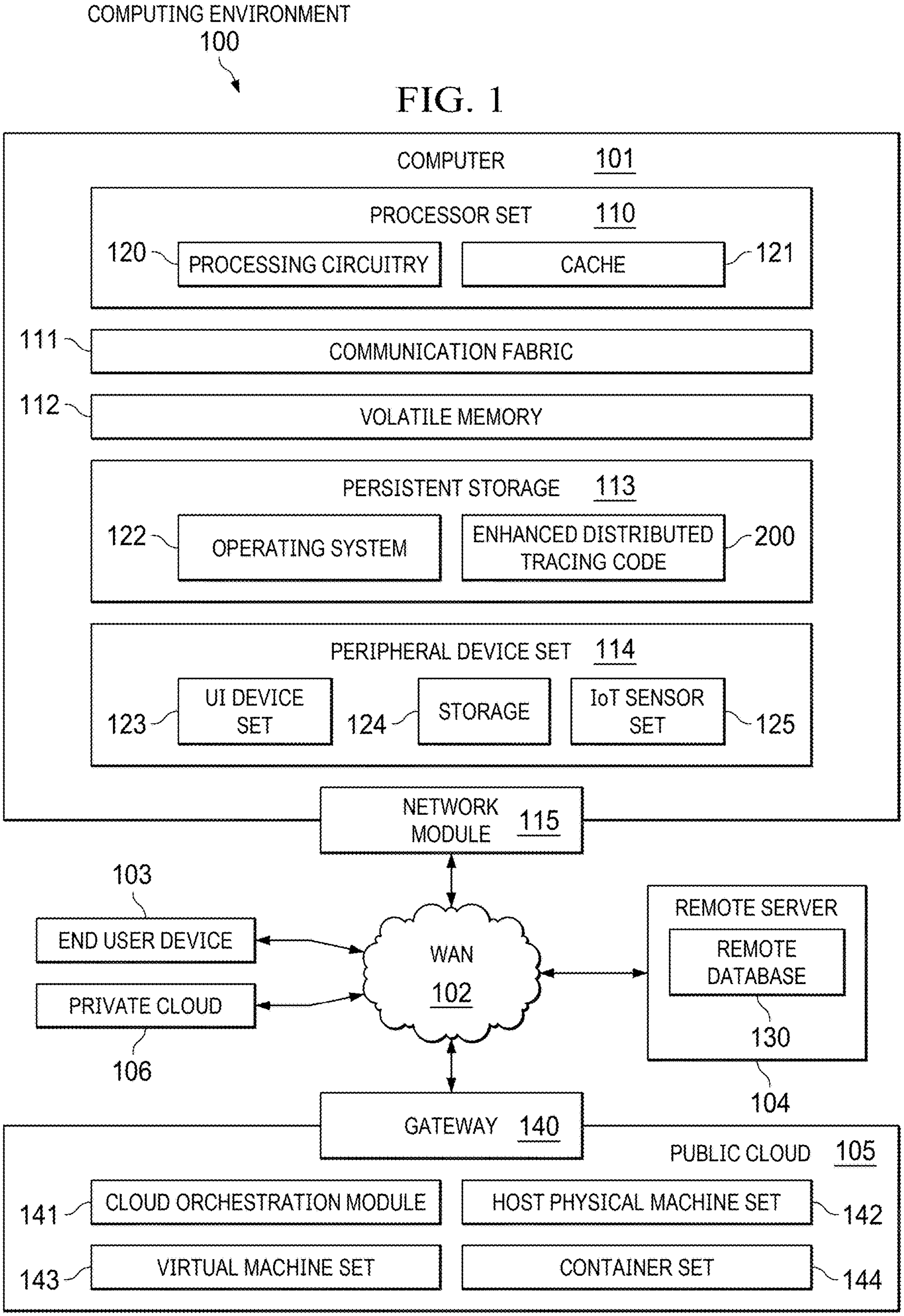
FIG. 1 is a pictorial representation of a computing environment in which illustrative embodiments may be implemented.

A computer-implemented method provides enhanced distributed tracing. One or more processors identify a set of microservices in a sequence of microservices preceding a preselected microservice in the sequence of microservices. The one or more processors identify each tracing data sample received from the set of microservices preceding the preselected microservice in the sequence of microservices. The one or more processors delete each tracing data sample corresponding to a set of selected transactions received from the set of microservices preceding the preselected microservice in the sequence of microservices that was dropped during rate-limiting sampling performed by the preselected microservice based on analysis of a result of the rate-limiting sampling of the set of selected transactions received from the preselected microservice thereby retaining a subset of tracing data samples corresponding to the set of selected transactions collected during head-based sampling. As a result, illustrative embodiments provide a technical effect of filtering out unnecessary tracing data samples, while retaining tracing data samples from different microservices in a sequence of microservices corresponding to a set of selected transactions to ensure trace sampling diversity using both head-based sampling and rate-limiting sampling, decreasing resource consumption.

Also, the one or more processors, using a tracing agent located in the preselected microservice of the sequence of microservices, perform the rate-limiting sampling of the set of selected transactions in accordance with a selected rate-limiting sampling rate in addition to the head-based sampling of the set of selected transactions based on the tracing agent determining that the preselected microservice was set to perform the rate-limiting sampling. The one or more processors send the result of the rate-limiting sampling of the set of selected transactions to a tracing server. The one or more processors, using the tracing server, perform the analysis of the result of the rate-limiting sampling of the set of selected transactions performed by the tracing agent located in the preselected microservice of the sequence of microservices. As a result, illustrative embodiments provide a technical effect of selecting a microservice of a sequence of microservices to perform both head-based sampling and rate-limiting sampling of a set of selected transactions to filter out unnecessary tracing data samples, while retaining tracing data samples from different microservices in the sequence of microservices corresponding to the set of selected transactions to ensure trace sampling diversity.

In addition, the one or more processors set a head-based sampling rate in an ingress gateway such that the sequence of microservices processing a plurality of transactions utilize the head-based sampling rate to perform the head-based sampling on the set of selected transactions of the plurality of transactions. As a result, illustrative embodiments provide a technical effect of having an ingress gateway set a head-based sampling rate for each microservice in a sequence of microservices processing transactions.

Further, the one or more processors set the preselected microservice in the sequence of microservices to perform the rate-limiting sampling in addition to the head-based sampling on the set of selected transactions of a plurality of transactions. As a result, illustrative embodiments provide a technical effect of having a selected microservice perform both head-based sampling and rate-limiting sampling of the set of selected transactions.

Furthermore, the one or more processors, using an ingress gateway, receive a plurality of transaction requests corresponding to a plurality of transactions from a plurality of client devices. The one or more processors, using the ingress gateway, select a set of transaction requests from the plurality of transaction requests based on a head-based sampling rate set in the ingress gateway. As a result, illustrative embodiments provide a technical effect of utilizing an ingress gateway to select a set of transaction requests from a plurality of transaction requests for transaction sampling based on a head-based sampling rate set in the ingress gateway.

Moreover, the one or more processors, using an ingress gateway, insert a head-based sampling label in a header of each respective transaction request of a set of transaction requests that were selected from a plurality of transaction requests based on a head-based sampling rate set in the ingress gateway. The one or more processors, using a plurality of network proxies, send the plurality of transaction requests to each respective microservice of the sequence of microservices in sequential order to process the plurality of transaction requests corresponding to a plurality of transactions. As a result, illustrative embodiments provide a technical effect of inserting a head-based sampling label in a header of each respective transaction request of a set of transaction requests that were selected from a plurality of transaction requests based on a head-based sampling rate set in the ingress gateway to identify certain transactions for sampling.

In addition, the one or more processors utilize a tracing agent located in each respective microservice of the sequence of microservices to collect tracing data samples corresponding to the set of selected transactions in accordance with the head-based sampling based on identifying a head-based sampling label inserted in a header of a set of transaction requests corresponding to the set of selected transactions. The one or more processors, using the tracing agent located in each respective microservice of the sequence of microservices, send the tracing data samples corresponding to the set of selected transactions that were collected in accordance with the head-based sampling to a tracing server. As a result, illustrative embodiments provide a technical effect of collecting tracing data samples corresponding to a set of selected transactions in accordance with head-based sampling based on identifying a head-based sampling label inserted in a header of a set of transaction requests corresponding to the set of selected transactions.

A computer system for enhanced distributed tracing comprises a communication fabric, one or more computer-readable storage media connected to the communication fabric, where the one or more computer-readable storage media store program instructions, and one or more processors connected to the communication fabric, where the one or more processors execute the program instructions. The one or more processors identify each tracing data sample received from the set of microservices preceding the preselected microservice in the sequence of microservices. The one or more processors delete each tracing data sample corresponding to a set of selected transactions received from the set of microservices preceding the preselected microservice in the sequence of microservices that was dropped during rate-limiting sampling performed by the preselected microservice based on analysis of a result of the rate-limiting sampling of the set of selected transactions received from the preselected microservice thereby retaining a subset of tracing data samples corresponding to the set of selected transactions collected during head-based sampling. As a result, illustrative embodiments provide a technical effect of filtering out unnecessary tracing data samples, while retaining tracing data samples from different microservices in a sequence of microservices corresponding to a set of selected transactions to ensure trace sampling diversity using both head-based sampling and rate-limiting sampling, decreasing resource consumption.

Also, the one or more processors, using a tracing agent located in the preselected microservice of the sequence of microservices, perform the rate-limiting sampling of the set of selected transactions in accordance with a selected rate-limiting sampling rate in addition to the head-based sampling of the set of selected transactions based on the tracing agent determining that the preselected microservice was set to perform the rate-limiting sampling. The one or more processors send the result of the rate-limiting sampling of the set of selected transactions to a tracing server. The one or more processors, using the tracing server, perform the analysis of the result of the rate-limiting sampling of the set of selected transactions performed by the tracing agent located in the preselected microservice of the sequence of microservices. As a result, illustrative embodiments provide a technical effect of selecting a microservice of a sequence of microservices to perform both head-based sampling and rate-limiting sampling of a set of selected transactions to filter out unnecessary tracing data samples, while retaining tracing data samples from different microservices in the sequence of microservices corresponding to the set of selected transactions to ensure trace sampling diversity.

In addition, the one or more processors set a head-based sampling rate in an ingress gateway such that the sequence of microservices processing a plurality of transactions utilize the head-based sampling rate to perform the head-based sampling on the set of selected transactions of the plurality of transactions. As a result, illustrative embodiments provide a technical effect of having an ingress gateway set a head-based sampling rate for each microservice in a sequence of microservices processing transactions.

Further, the one or more processors set the preselected microservice in the sequence of microservices to perform the rate-limiting sampling in addition to the head-based sampling on the set of selected transactions of a plurality of transactions. As a result, illustrative embodiments provide a technical effect of having a selected microservice perform both head-based sampling and rate-limiting sampling of the set of selected transactions.

Furthermore, the one or more processors, using an ingress gateway, receive a plurality of transaction requests corresponding to a plurality of transactions from a plurality of client devices. The one or more processors, using the ingress gateway, select a set of transaction requests from the plurality of transaction requests based on a head-based sampling rate set in the ingress gateway. As a result, illustrative embodiments provide a technical effect of utilizing an ingress gateway to select a set of transaction requests from a plurality of transaction requests for transaction sampling based on a head-based sampling rate set in the ingress gateway.

Moreover, the one or more processors, using an ingress gateway, insert a head-based sampling label in a header of each respective transaction request of a set of transaction requests that were selected from a plurality of transaction requests based on a head-based sampling rate set in the ingress gateway. The one or more processors, using a plurality of network proxies, send the plurality of transaction requests to each respective microservice of the sequence of microservices in sequential order to process the plurality of transaction requests corresponding to a plurality of transactions. As a result, illustrative embodiments provide a technical effect of inserting a head-based sampling label in a header of each respective transaction request of a set of transaction requests that were selected from a plurality of transaction requests based on a head-based sampling rate set in the ingress gateway to identify certain transactions for sampling.

A computer program product for enhanced distributed tracing comprises one or more computer-readable storage media having program instructions collectively stored therein, the program instructions executable by one or more processors. The one or more processors identify each tracing data sample received from the set of microservices preceding the preselected microservice in the sequence of microservices. The one or more processors delete each tracing data sample corresponding to a set of selected transactions received from the set of microservices preceding the preselected microservice in the sequence of microservices that was dropped during rate-limiting sampling performed by the preselected microservice based on analysis of a result of the rate-limiting sampling of the set of selected transactions received from the preselected microservice thereby retaining a subset of tracing data samples corresponding to the set of selected transactions collected during head-based sampling. As a result, illustrative embodiments provide a technical effect of filtering out unnecessary tracing data samples, while retaining tracing data samples from different microservices in a sequence of microservices corresponding to a set of selected transactions to ensure trace sampling diversity using both head-based sampling and rate-limiting sampling, decreasing resource consumption.

Also, the one or more processors, using a tracing agent located in the preselected microservice of the sequence of microservices, perform the rate-limiting sampling of the set of selected transactions in accordance with a selected rate-limiting sampling rate in addition to the head-based sampling of the set of selected transactions based on the tracing agent determining that the preselected microservice was set to perform the rate-limiting sampling. The one or more processors send the result of the rate-limiting sampling of the set of selected transactions to a tracing server. The one or more processors, using the tracing server, perform the analysis of the result of the rate-limiting sampling of the set of selected transactions performed by the tracing agent located in the preselected microservice of the sequence of microservices. As a result, illustrative embodiments provide a technical effect of selecting a microservice of a sequence of microservices to perform both head-based sampling and rate-limiting sampling of a set of selected transactions to filter out unnecessary tracing data samples, while retaining tracing data samples from different microservices in the sequence of microservices corresponding to the set of selected transactions to ensure trace sampling diversity.

In addition, the one or more processors set a head-based sampling rate in an ingress gateway such that the sequence of microservices processing a plurality of transactions utilize the head-based sampling rate to perform the head-based sampling on the set of selected transactions of the plurality of transactions. As a result, illustrative embodiments provide a technical effect of having an ingress gateway set a head-based sampling rate for each microservice in a sequence of microservices processing transactions.

Further, the one or more processors set the preselected microservice in the sequence of microservices to perform the rate-limiting sampling in addition to the head-based sampling on the set of selected transactions of a plurality of transactions. As a result, illustrative embodiments provide a technical effect of having a selected microservice perform both head-based sampling and rate-limiting sampling of the set of selected transactions.

Furthermore, the one or more processors, using an ingress gateway, receive a plurality of transaction requests corresponding to a plurality of transactions from a plurality of client devices. The one or more processors, using the ingress gateway, select a set of transaction requests from the plurality of transaction requests based on a head-based sampling rate set in the ingress gateway. As a result, illustrative embodiments provide a technical effect of utilizing an ingress gateway to select a set of transaction requests from a plurality of transaction requests for transaction sampling based on a head-based sampling rate set in the ingress gateway.

Moreover, the one or more processors, using an ingress gateway, insert a head-based sampling label in a header of each respective transaction request of a set of transaction requests that were selected from a plurality of transaction requests based on a head-based sampling rate set in the ingress gateway. The one or more processors, using a plurality of network proxies, send the plurality of transaction requests to each respective microservice of the sequence of microservices in sequential order to process the plurality of transaction requests corresponding to a plurality of transactions. As a result, illustrative embodiments provide a technical effect of inserting a head-based sampling label in a header of each respective transaction request of a set of transaction requests that were selected from a plurality of transaction requests based on a head-based sampling rate set in the ingress gateway to identify certain transactions for sampling.

In addition, the one or more processors utilize a tracing agent located in each respective microservice of the sequence of microservices to collect tracing data samples corresponding to the set of selected transactions in accordance with the head-based sampling based on identifying a head-based sampling label inserted in a header of a set of transaction requests corresponding to the set of selected transactions. The one or more processors, using the tracing agent located in each respective microservice of the sequence of microservices, send the tracing data samples corresponding to the set of selected transactions that were collected in accordance with the head-based sampling to a tracing server. As a result, illustrative embodiments provide a technical effect of collecting tracing data samples corresponding to a set of selected transactions in accordance with head-based sampling based on identifying a head-based sampling label inserted in a header of a set of transaction requests corresponding to the set of selected transactions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
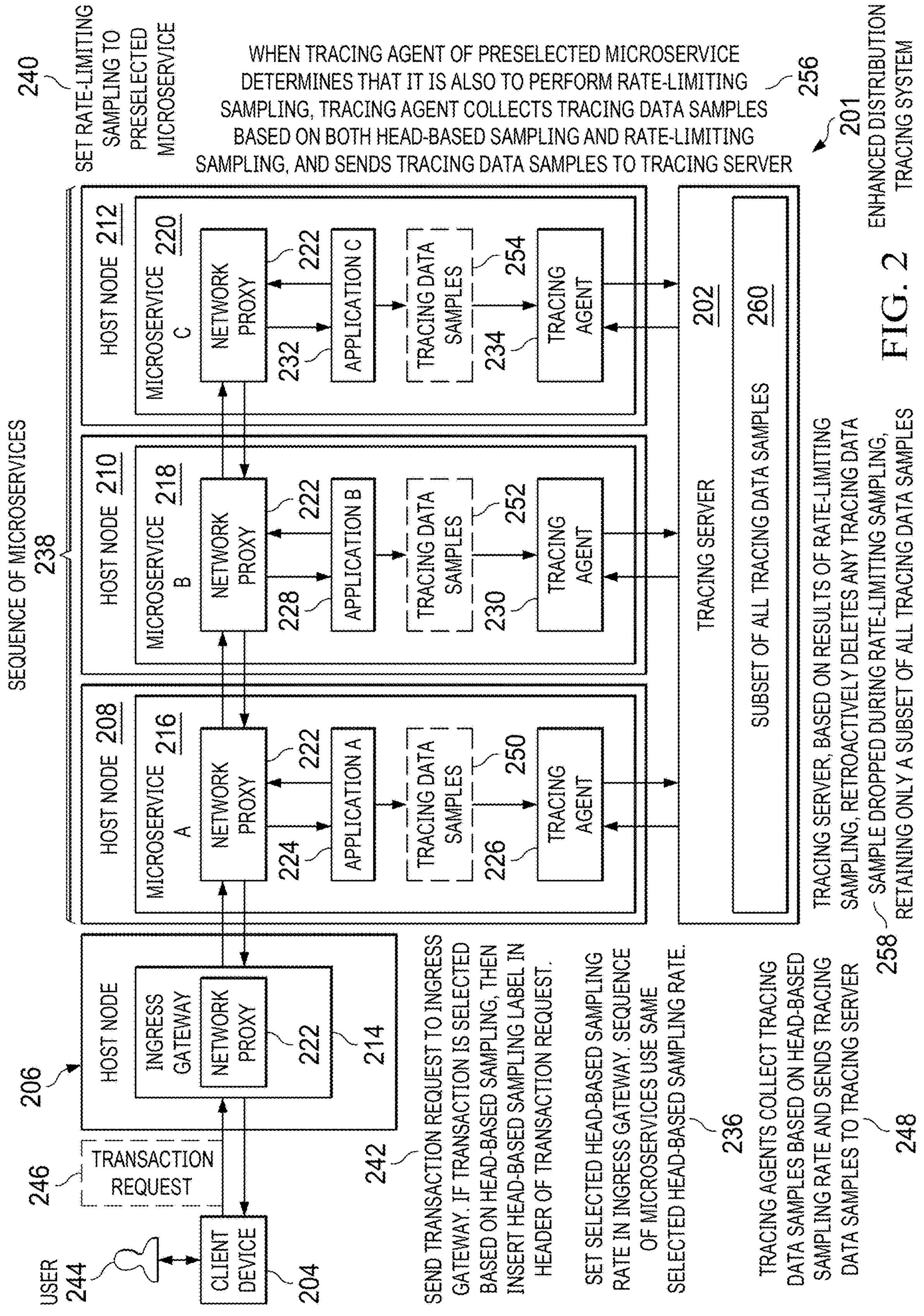
FIG. 2 is a diagram illustrating an example of an enhanced distributed tracing system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as enhanced distributed tracing code 200.

For example, enhanced distributed tracing code 200 captures relevant tracing data samples corresponding to a set of selected transactions across an entire sequence of a plurality of microservices in a distributed microservice architecture of a cloud environment to provide an accurate and complete representation of the behavior of the plurality of microservices in the distributed microservice architecture without incurring unnecessary resource (e.g., processor, memory, storage, and the like) overhead. In other words, in addition to determining the behavior of the plurality of microservices, enhanced distributed tracing code 200 decreases resource consumption in the distributed microservice architecture.

Enhanced distributed tracing code 200 utilizes a tracing agent that collects tracing data samples from an application, which provides a microservice corresponding to the set of selected transactions that were requested by one or more client device users, in accordance with head-based sampling. In other words, enhanced distributed tracing code 200 collects tracing data samples corresponding to the set of selected transactions. Enhanced distributed tracing code 200 select the set of selected transactions based on a sampling rate set for the head-based sampling.

Enhanced distributed tracing code 200 utilizes the tracing agent to send the tracing data samples corresponding to the set of selected transactions to a tracing server. The tracing agent is one of a plurality of tracing agents that perform head-based sampling at the same sampling rate. Each respective tracing agent of the plurality of tracing agents corresponds to a different microservice in the sequence of the plurality of microservices. Each respective microservice in the sequence of the plurality of microservices is located in a different host node of the distributed microservice architecture in the cloud environment. However, in an alternative illustrative embodiment, the plurality of microservices are located in the same host node.

When a particular preselected tracing agent of the plurality of tracing agents determines that that particular preselected tracing agent is to perform rate-limiting sampling as well, that particular preselected tracing agent collects tracing data samples based on both head-based sampling and rate-limiting sampling. Then, enhanced distributed tracing code 200 utilizes that particular tracing agent to send both head-based tracing data samples and rate-limiting tracing data samples to the tracing server.

In response to receiving results of the rate-limiting sampling from that particular preselected tracing agent, enhanced distributed tracing code 200 utilizes the tracing server to analyze the results of the rate-limiting sampling received from that particular preselected tracing agent. In addition, enhanced distributed tracing code 200 utilizes the tracing server to identify a set of tracing agents preceding that particular preselected tracing agent in the sequence of the plurality of tracing agents. Further, enhanced distributed tracing code 200 utilizes the tracing server to identify all tracing data samples received from the set of tracing agents preceding that particular preselected tracing agent in the sequence of the plurality of tracing agents.

In response to identifying all the tracing data samples received from the set of tracing agents preceding that particular preselected tracing agent in the sequence of the plurality of tracing agents, enhanced distributed tracing code 200 utilizes the tracing server to retroactively delete any tracing data sample corresponding to the set of selected transactions that was dropped during the rate-limiting sampling performed by that particular preselected tracing agent based on the tracing server analyzing the results of the rate-limiting sampling received from that particular preselected tracing agent. As a result of deleting any tracing data sample corresponding to the set of selected transactions that was dropped during the rate-limiting sampling performed by that particular preselected tracing agent, the tracing server now only retains a subset of all the tracing data samples corresponding to the set of selected transactions collected during the head-based sampling, saving storage resources.

In addition to enhanced distributed tracing code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and enhanced distributed tracing code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in enhanced distributed tracing code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a user who utilizes the enhanced distributed tracing services provided by computer 101), and may take any of the forms discussed above in connection with computer 101. EUD 103 typically receives helpful and useful data from the operations of computer 101. For example, in a hypothetical case where computer 101 is designed to provide a potential performance optimization recommendation based on tracing data analysis to the end user, this recommendation would typically be communicated from network module 115 of computer 101 through WAN 102 to EUD 103. In this way, EUD 103 can display, or otherwise present, the potential performance optimization recommendation to the end user. In some embodiments, EUD 103 may be a client device, such as a thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a potential performance optimization recommendation based on historical tracing data, then this historical tracing data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Cloud distributed tracing often presents a significant challenge in managing a large volume of tracing data generated by a distributed microservice architecture, platform, environment, or the like. As applications scale and adopt a microservices architecture, the volume of tracing data can quickly become unmanageable, needing storage, retrieval, and analysis solutions.

Sampling is one method for preventing generation of large volumes of tracing data in cloud environments. Common sampling methods include, for example, head-based sampling, tail-based sampling, and rate-limiting sampling. However, each of these sampling methods has limitations.

Typically, an initiating microservice in a sequence of microservices determines the sampling rate for head-based sampling and all downstream microservices in the sequence then follow that same sampling rate in cloud distributed tracing. For example, when the sampling rate of microservice A in a sequence of microservices is set at 60% head-based sampling, microservice A will only generate tracing data for a set of selected transactions in accordance with the set sampling rate. For example, if microservice A processes three transactions, then microservice A will only select two of the three transactions (i.e., approximately 60% of the processed transactions) to generate tracing data samples. When microservice A passes the transaction to microservice B for further processing and microservices B passes the transaction to microservice C for still further processing, microservices B and C will only generate tracing data samples corresponding to the set of selected transactions based on the same sampling rate as microservice A. However, head-based sampling can miss needed information in one or more of the microservices in the sequence. For example, if the microservices are called layer by layer, then head-based sampling may lead to rapid tracing data growth.

When a microservice performs rate-limiting sampling, a tracing agent of that microservice utilizes a leaky bucket algorithm to ensure that traces are sampled at a set constant rate. For example, when rate-limiting sampling is set at 4.0, the microservice application samples transactions at the rate of 4 traces per second. However, rate-limiting sampling, which controls the amount of tracing data generated, does not provide a comprehensive tracing chain, especially when a transaction involves multiple microservices with varying logging rates.

Illustrative embodiments take into account and address the limitations of these sampling methods by utilizing head-based sampling to ensure that all tracing data on a set of selected transactions is collected, as well as rate-limiting sampling to control the number of tracing data generated for the set of selected transactions. Current solutions can only utilize one sampling method. By illustrative embodiments utilizing multiple sampling methods within the same microservice transaction chain, illustrative embodiments decrease the consumption of resources utilized for sampling. Further, by utilizing multiple sampling methods, illustrative embodiments are able to filter out numerous unnecessary tracing data samples, while retaining tracing data samples from different microservices in the chain of microservices corresponding to the set of selected transactions to ensure trace sampling diversity.

Thus, illustrative embodiments provide one or more technical solutions that overcome a technical problem with current solutions only being able to utilize one tracing method with its associated limitations. As a result, these one or more technical solutions provide a technical effect and practical application in the field of distributed tracing.

With reference now to FIG. 2, a diagram illustrating an example of an enhanced distributed tracing system is depicted in accordance with an illustrative embodiment. Enhanced distributed tracing system 201 may be implemented in a computing environment, such as computing environment 100 in FIG. 1. Enhanced distributed tracing system 201 is a system of hardware and software components for utilizing multiple sampling methods within the same microservice transaction sequence to decrease resource consumption by deleting unnecessary tracing data samples, while retaining tracing data samples from different microservices in the sequence of microservices ensuring trace sampling diversity.

In this example, enhanced distributed tracing system 201 includes tracing server 202, client device 204, host node 206, host node 208, host node 210, and host node 212. Tracing server 202 may be, for example, computer 101 in FIG. 1. Client device 204 may be, for example, EUD 103 in FIG. 1. Host node 206, host node 208, host node 210, and host node 212 may be, for example, host physical machine set 142, virtual machine set 143, or a combination thereof. However, it should be noted that enhanced distributed tracing system 201 is intended as an example only and not as a limitation on illustrative embodiments. For example, enhanced distributed tracing system 201 can include any number of tracing servers, client devices, host nodes, and other devices and components not shown.

In this example, host node 206 includes ingress gateway 214. Host node 206 utilizes ingress gateway 214 to receive transaction requests from client devices, such as client device 204, via a network, such as WAN 102 in FIG. 1. Host node 208 hosts microservice A 216, host node 210 hosts microservice B 218, and host node 212 hosts microservice C 220. Microservice A 216, microservice B 218, and microservice C 220 form sequence of microservices 238. However, it should be noted that sequence of microservices 238 is intended as an example only and not as a limitation on illustrative embodiments. For example, sequence of microservices 238 can include any number of microservices. Sequence of microservices 238 process transactions in series from microservice A 216 to microservice B 218 to microservice C 220. Each of ingress gateway 214, microservice A 216, microservice B 218, and microservice C 220 utilize network proxy 222 to pass transaction requests to the appropriate microservice at the appropriate time.

In addition, microservice A 216 includes application A 224 and tracing agent 226, microservice B 218 includes application B 228 and tracing agent 230, and microservice C 220 includes application C 232 and tracing agent 234. Microservice A 216, microservice B 218, and microservice C 220 utilize application A 224, application B 228, and application C 232 to generate tracing data corresponding to processed transactions. Microservice A 216, microservice B 218, and microservice C 220 utilize tracing agent 226, tracing agent 230, and tracing agent 234 to collect the tracing data generated by application A 224, application B 228, and application C 232.

At 236, tracing server 202 sets a selected head-based sampling rate in ingress gateway 214. As a result, microservice A 216, microservice B 218, and microservice C 220, which comprise sequence of microservices 238, perform head-based sampling based on the selected head-based sampling rate set in ingress gateway 214. In addition, at 240, tracing server 202 sets a preselected microservice, such as microservice C 220 or a last microservice in a sequence of microservices, to perform rate-limiting sampling as well as head-based sampling. However, it should be noted that the preselected microservice may be any one of the microservices comprising a sequence of microservices.

At 242, user 244, using client device 204, sends transaction request 246 to ingress gateway 214. In response to ingress gateway 214 selecting the transaction corresponding to transaction request 246 for head-based sampling based on the selected head-based sampling rate, ingress gateway 214 inserts a head-based sampling label in a header of transaction request 246, identifying the transaction corresponding to transaction request 246 to be included in the head-based sampling performed by sequence of microservices 238 (i.e., microservice A 216, microservice B 218, and microservice C 220).

At 248, tracing agent 226 of microservice A 216, tracing agent 230 of microservice B 218, and tracing agent 234 of microservice C 220 collect tracing data samples 250, tracing data samples 252, and tracing data samples 254 corresponding to the processed transaction associated with transaction request 246 from application A 224, application B 228, and application C 232, respectively, based on application A 224, application B 228, and application C 232 identifying the head-based sampling label in the header of the transaction request. Tracing agent 226, tracing agent 230, and tracing agent 234 send tracing data samples 250, tracing data samples 252, and tracing data samples 254 to tracing server 202.

In this example, at 256, when tracing agent 234 of preselected microservice C 220, which is further processing the transaction in sequence of microservices 238, determines that tracing agent 234 is also to perform rate-limiting sampling, tracing agent 234 collects tracing data samples 254 based on both the head-based sampling and the rate-limiting sampling. Afterward, tracing agent 234 sends tracing data samples 254, which are based on both head-based sampling and rate-limiting sampling, to tracing server 202.

At 258, based on tracing server 202 analyzing tracing data samples 254 that contained results of the rate-limiting sampling performed by tracing agent 234 of preselected microservice C 220, tracing server 202 retroactively deletes any tracing data sample corresponding to the transaction that was dropped during the rate-limiting sampling performed by tracing agent 234 of preselected microservice C 220, thereby retaining only subset of all tracing data samples 260 corresponding to the transaction collected during the head-based sampling performed by microservice A 216, microservice B 218, and microservice C 220.

Figure 3:
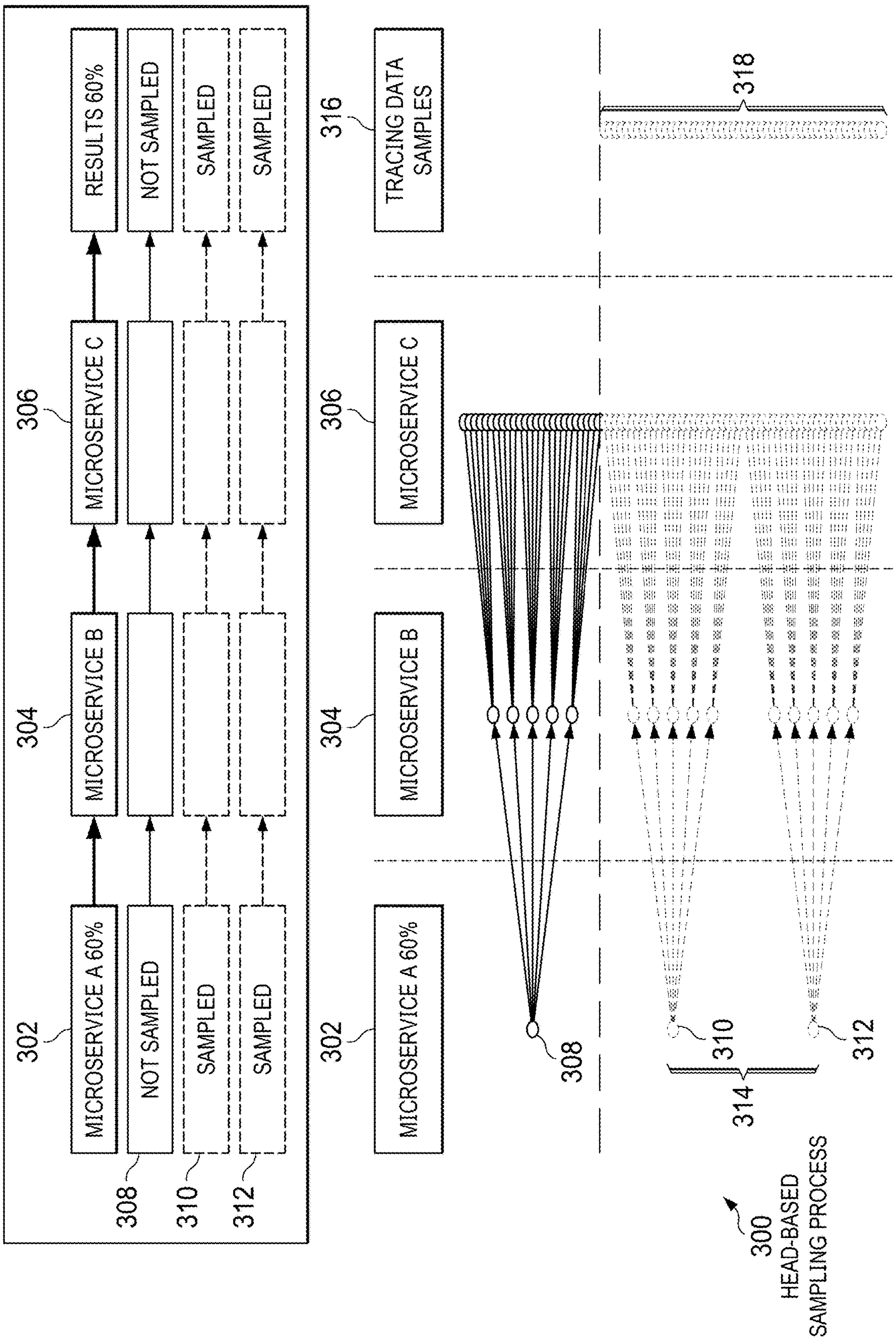
FIG. 3 is a diagram illustrating an example of a head-based sampling process in accordance with an illustrative embodiment.

With reference now to FIG. 3, a diagram illustrating an example of a head-based sampling process is depicted in accordance with an illustrative embodiment. Head-based sampling process 300 can be implemented in, for example, enhanced distributed tracing system 201 in FIG. 2.

In this example, head-based sampling process 300 includes microservice A 302, microservice B 304, and microservice C 306. It should be noted that microservice A 302, microservice B 304, and microservice C 306 are the same as microservice A 216, microservice B 218, and microservice C 220 in FIG. 2. In addition, microservice A 302, microservice B 304, and microservice C 306 form a sequence of microservices, such as sequence of microservices 238 in FIG. 2, to process a plurality of transactions, such as transaction 308, transaction 310, and transaction 312.

Further in this example, microservice A 302, microservice B 304, and microservice C 306 are performing head-based sampling of transaction 308, transaction 310, and transaction 312 at a set head-based sampling rate of 60%. However, it should be noted that the head-based sampling rate can be set at any percentage. Also, it should be noted that the head-based sampling rate was set in an ingress gateway, such as ingress gateway 214 in FIG. 2.

As a result, microservice A 302, microservice B 304, and microservice C 306 utilize that same head-based sampling rate of 60% set in the ingress gateway. Thus, in this example, transaction 308 is not sampled and transaction 310 and transaction 312 are sampled. Transaction 310 and transaction 312 form set of selected transactions 314 for collecting tracing data samples 316 using head-based sampling. Head-based tracing data samples 318 is the result of the head-based sampling of set of selected transactions 314.

Figure 4:
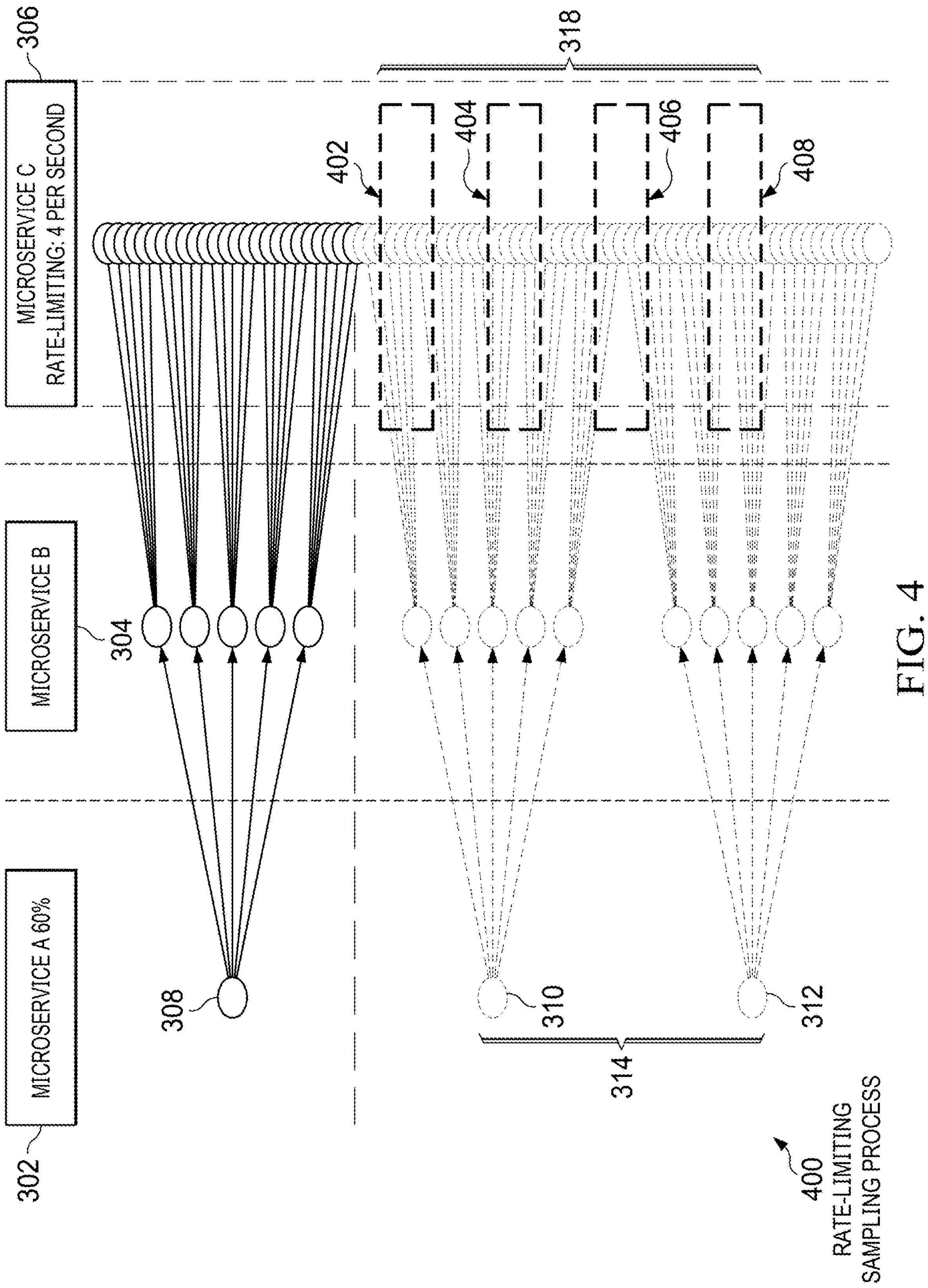
FIG. 4 is a diagram illustrating an example of a rate-limiting sampling process in accordance with an illustrative embodiment.

With reference now to FIG. 4, a diagram illustrating an example of a rate-limiting sampling process is depicted in accordance with an illustrative embodiment. Rate-limiting sampling process 400 can be implemented in, for example, enhanced distributed tracing system 201 in FIG. 2.

In this example, rate-limiting sampling process 400 also includes microservice A 302, microservice B 304, and microservice C 306, which are performing head-based sampling of set of selected transactions 314 to generate head-based tracing data samples 318. However, it should be noted that microservice C 306 is a preselected microservice set to also perform rate-based sampling of set of selected transactions 314. In this example, the rate-limiting sampling rate is set at 4 traces per second. However, the rate-limiting sampling rate of 4 traces per second is intended as an example only and not as a limitation on illustrative embodiments. In other words, the rate-limiting sampling can be set at any rate.

In this example, microservice C 306 generates tracing data samples corresponding to set of selected transactions 314 to include both head-based tracing data samples 318 as well as rate-limiting tracing data sample 402, rate-limiting tracing data sample 404, rate-limiting tracing data sample 406, and rate-limiting tracing data sample 408. Microservice C 306 generates rate-limiting tracing data sample 402, rate-limiting tracing data sample 404, rate-limiting tracing data sample 406, and rate-limiting tracing data sample 408 using, for example, a leaky bucket algorithm, at a constant rate of 4 traces per second.

Figure 5:
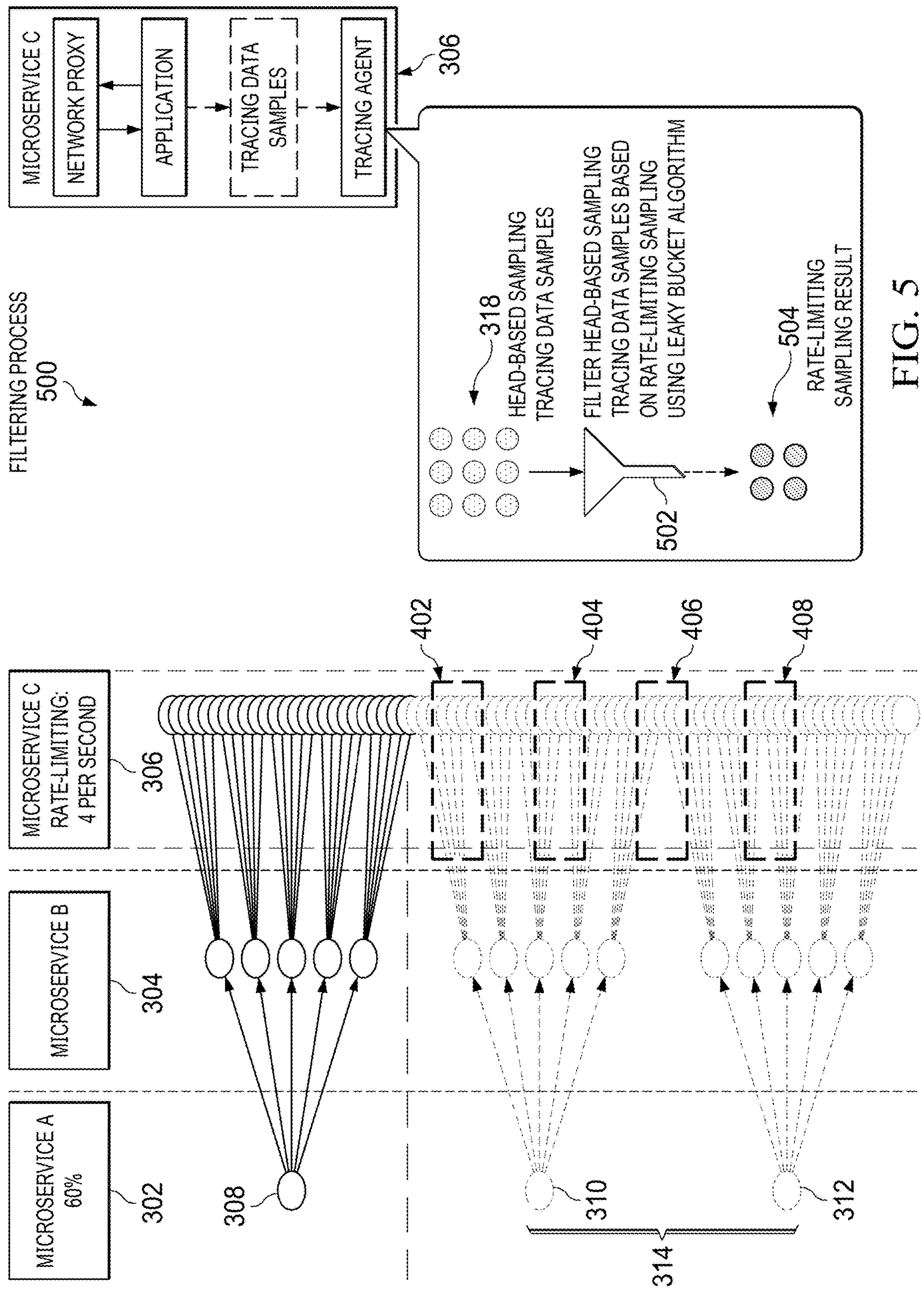
FIG. 5 is a diagram illustrating an example of a filtering process in accordance with an illustrative embodiment.

With reference now to FIG. 5, a diagram illustrating an example of a filtering process is depicted in accordance with an illustrative embodiment. Filtering process 500 is implemented in microservice C 306, which in this example is the preselected microservice in the sequence of microservices.

At 502, the tracing agent of microservice C 306, such as, for example, tracing agent 234 of microservice C 220 in FIG. 2, filters or drops head-based tracing data samples from head-based tracing data samples 318 based on rate-limiting sampling using a leaky bucket algorithm. In this example, the filtering of head-based tracing data samples 318 results in rate-limiting sampling result 504, which includes rate-limiting tracing data sample 402, rate-limiting tracing data sample 404, rate-limiting tracing data sample 406, and rate-limiting tracing data sample 408. The tracing agent of microservice C 306 sends rate-limiting sampling result 504 to a tracing server, such as, for example, tracing server 202 in FIG. 2 for analysis.

Figure 6:
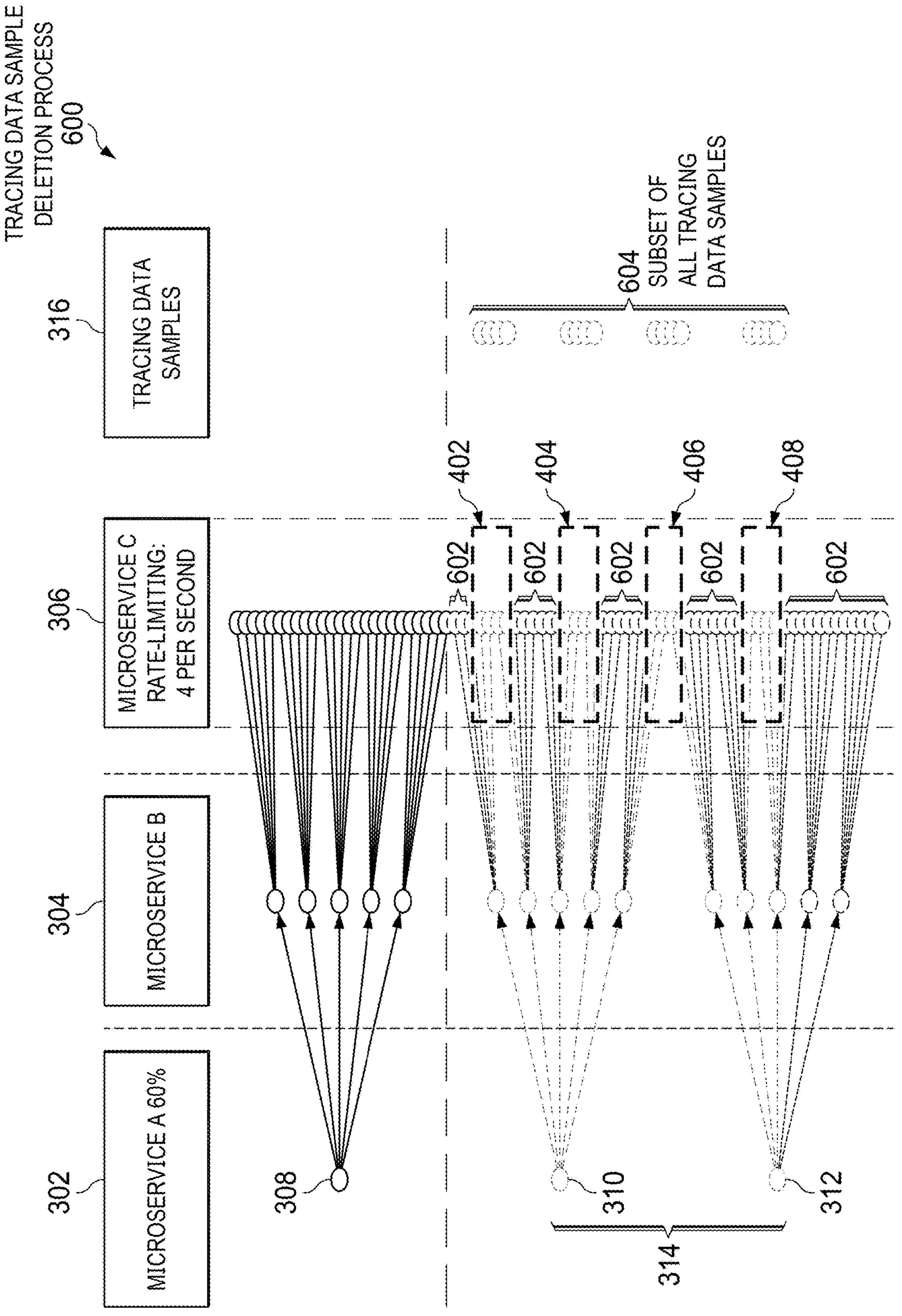
FIG. 6 is a diagram illustrating an example of a tracing data sample deletion process in accordance with an illustrative embodiment.

With reference now to FIG. 6, a diagram illustrating an example of a tracing data sample deletion process is depicted in accordance with an illustrative embodiment. Tracing data sample deletion process 600 is implemented in a tracing server, such as, for example, tracing server 202 in FIG. 2.

In response to the tracing server receiving a rate-limiting sampling result, such as rate-limiting sampling result 504 in FIG. 5, which includes rate-limiting tracing data sample 402, rate-limiting tracing data sample 404, rate-limiting tracing data sample 406, and rate-limiting tracing data sample 408, from the tracing agent of microservice C 306, the tracing server analyzes the rate-limiting result. In response to performing the analysis of the rate-limiting sampling result, the tracing server deletes tracing data samples 602 corresponding to set of selected transactions 314 that were filtered out during the rate-limiting sampling performed by the tracing agent of microservice C 306 thereby retaining only subset of all tracing data samples 604 collected during the head-based sampling.

Figure 7A:
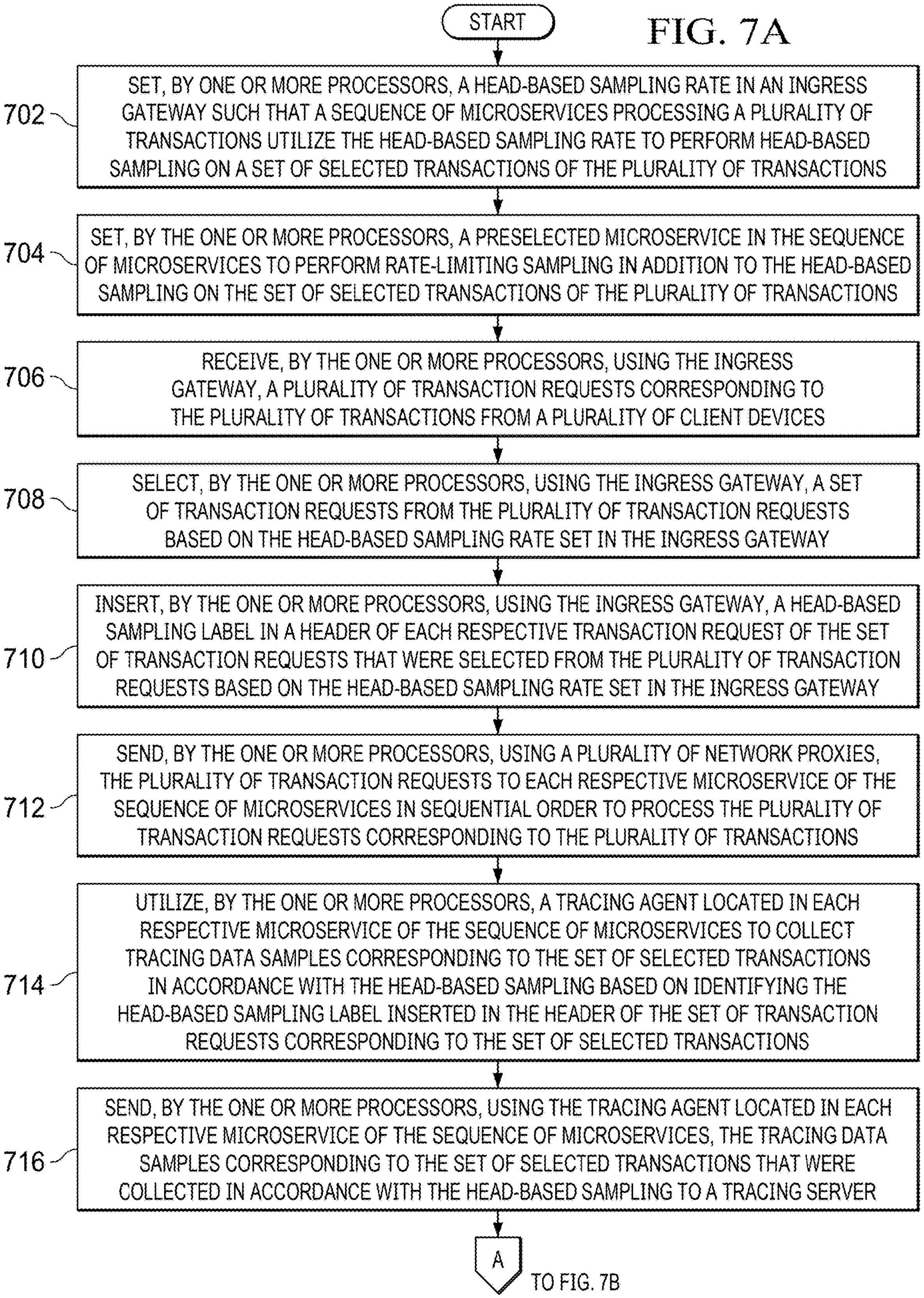
FIGS. 7A-7B are a flowchart illustrating a process for enhanced distributed tracing in accordance with an illustrative embodiment.
Figure 7B:
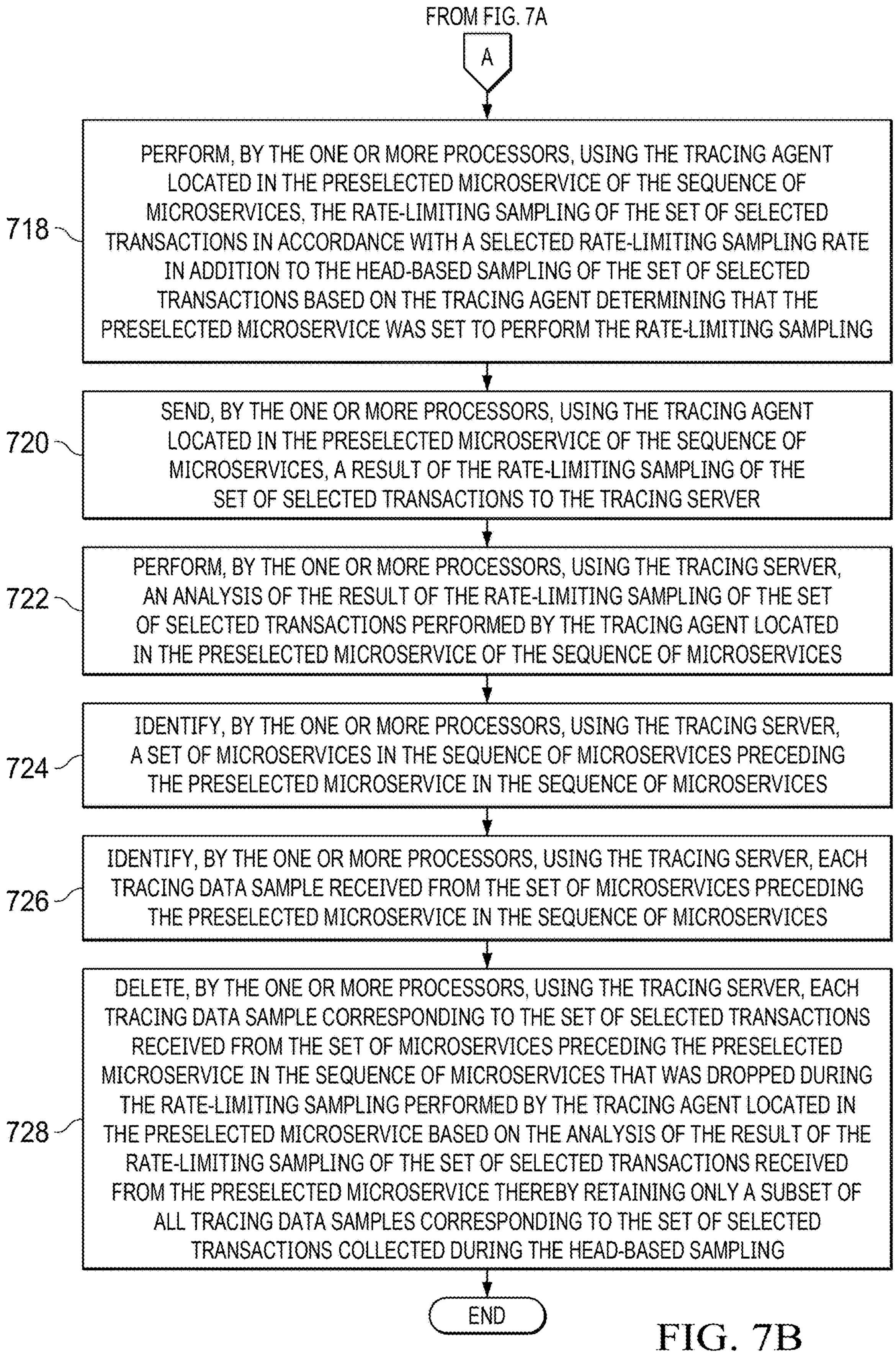

With reference now to FIGS. 7A-7B, a flowchart illustrating a process for enhanced distributed tracing is shown in accordance with an illustrative embodiment. The process shown in FIGS. 7A-7B may be implemented in one or more processors in a computing environment, such as, for example, computing environment 100 in FIG. 1 or enhanced distributed tracing system 201 in FIG. 2. For example, the process shown in FIGS. 7A-7B may be implemented by the one or more processors using enhanced distributed tracing code 200 in FIG. 1.

The process begins when the one or more processors set a head-based sampling rate in an ingress gateway such that a sequence of microservices processing a plurality of transactions utilize the head-based sampling rate to perform head-based sampling on a set of selected transactions of the plurality of transactions (step 702). In addition, the one or more processors set a preselected microservice in the sequence of microservices to perform rate-limiting sampling in addition to the head-based sampling on the set of selected transactions of the plurality of transactions (step 704).

The one or more processors, using the ingress gateway, receive a plurality of transaction requests corresponding to the plurality of transactions from a plurality of client devices (step 706). The one or more processors, using the ingress gateway, select a set of transaction requests from the plurality of transaction requests based on the head-based sampling rate set in the ingress gateway (step 708).

The one or more processors, using the ingress gateway, insert a head-based sampling label in a header of each respective transaction request of the set of transaction requests that were selected from the plurality of transaction requests based on the head-based sampling rate set in the ingress gateway (step 710). The one or more processors, using a plurality of network proxies, send the plurality of transaction requests to each respective microservice of the sequence of microservices in sequential order to process the plurality of transaction requests corresponding to the plurality of transactions (step 712).

The one or more processors utilize a tracing agent located in each respective microservice of the sequence of microservices to collect tracing data samples corresponding to the set of selected transactions in accordance with the head-based sampling based on identifying the head-based sampling label inserted in the header of the set of transaction requests corresponding to the set of selected transactions (step 714). The one or more processors, using the tracing agent located in each respective microservice of the sequence of microservices, send the tracing data samples corresponding to the set of selected transactions that were collected in accordance with the head-based sampling to a tracing server (step 716).

The one or more processors, using the tracing agent located in the preselected microservice of the sequence of microservices, perform the rate-limiting sampling of the set of selected transactions in accordance with a selected rate-limiting sampling rate in addition to the head-based sampling of the set of selected transactions based on the tracing agent determining that the preselected microservice was set to perform the rate-limiting sampling (step 718). The one or more processors, using the tracing agent located in the preselected microservice of the sequence of microservices, send a result of the rate-limiting sampling of the set of selected transactions to the tracing server (step 720). The one or more processors, using the tracing server, perform an analysis of the result of the rate-limiting sampling of the set of selected transactions performed by the tracing agent located in the preselected microservice of the sequence of microservices (step 722).

The one or more processors, using the tracing server, identify a set of microservices in the sequence of microservices preceding the preselected microservice in the sequence of microservices (step 724). Further, the one or more processors, using the tracing server, identify each tracing data sample received from the set of microservices preceding the preselected microservice in the sequence of microservices (step 726). The one or more processors, using the tracing server, delete each tracing data sample corresponding to the set of selected transactions received from the set of microservices preceding the preselected microservice in the sequence of microservices that was dropped during the rate-limiting sampling performed by the tracing agent located in the preselected microservice based on the analysis of the result of the rate-limiting sampling of the set of selected transactions received from the preselected microservice thereby retaining only a subset of all tracing data samples corresponding to the set of selected transactions collected during the head-based sampling (step 728).

Thus, illustrative embodiments of the present disclosure provide a computer-implemented method, computer system, and computer program product for enhanced distributed tracing. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for enhanced distributed tracing, the computer-implemented method comprising:

identifying, by one or more processors, a set of microservices in a sequence of microservices preceding a preselected microservice in the sequence of microservices;

identifying, by the one or more processors, each tracing data sample received from the set of microservices preceding the preselected microservice in the sequence of microservices; and deleting, by the one or more processors, each tracing data sample corresponding to a set of selected transactions received from the set of microservices preceding the preselected microservice in the sequence of microservices that was dropped during rate-limiting sampling performed by the preselected microservice based on analysis of a result of the rate-limiting sampling of the set of selected transactions received from the preselected microservice thereby retaining a subset of tracing data samples corresponding to the set of selected transactions collected during head-based sampling.

2. The computer-implemented method of claim 1, further comprising:

performing, by the one or more processors, using a tracing agent located in the preselected microservice of the sequence of microservices, the rate-limiting sampling of the set of selected transactions in accordance with a selected rate-limiting sampling rate in addition to the head-based sampling of the set of selected transactions based on the tracing agent determining that the preselected microservice was set to perform the rate-limiting sampling;

sending, by the one or more processors, the result of the rate-limiting sampling of the set of selected transactions to a tracing server; and performing, by the one or more processors, using the tracing server, the analysis of the result of the rate-limiting sampling of the set of selected transactions performed by the tracing agent located in the preselected microservice of the sequence of microservices.

3. The computer-implemented method of claim 1, further comprising:

setting, by the one or more processors, a head-based sampling rate in an ingress gateway such that the sequence of microservices processing a plurality of transactions utilize the head-based sampling rate to perform the head-based sampling on the set of selected transactions of the plurality of transactions.

4. The computer-implemented method of claim 1, further comprising:

setting, by the one or more processors, the preselected microservice in the sequence of microservices to perform the rate-limiting sampling in addition to the head-based sampling on the set of selected transactions of a plurality of transactions.

5. The computer-implemented method of claim 1, further comprising:

receiving, by the one or more processors, using an ingress gateway, a plurality of transaction requests corresponding to a plurality of transactions from a plurality of client devices; and selecting, by the one or more processors, using the ingress gateway, a set of transaction requests from the plurality of transaction requests based on a head-based sampling rate set in the ingress gateway.

6. The computer-implemented method of claim 1, further comprising:

inserting, by the one or more processors, using an ingress gateway, a head-based sampling label in a header of each respective transaction request of a set of transaction requests that were selected from a plurality of transaction requests based on a head-based sampling rate set in the ingress gateway; and sending, by the one or more processors, using a plurality of network proxies, the plurality of transaction requests to each respective microservice of the sequence of microservices in sequential order to process the plurality of transaction requests corresponding to a plurality of transactions.

7. The computer-implemented method of claim 1, further comprising:

utilizing, by the one or more processors, a tracing agent located in each respective microservice of the sequence of microservices to collect tracing data samples corresponding to the set of selected transactions in accordance with the head-based sampling based on identifying a head-based sampling label inserted in a header of a set of transaction requests corresponding to the set of selected transactions; and sending, by the one or more processors, using the tracing agent located in each respective microservice of the sequence of microservices, the tracing data samples corresponding to the set of selected transactions that were collected in accordance with the head-based sampling to a tracing server.

8. A computer system for enhanced distributed tracing, the computer system comprising:

a communication fabric;

one or more computer-readable storage media connected to the communication fabric, wherein the one or more computer-readable storage media collectively store program instructions; and one or more processors connected to the communication fabric, wherein the one or more processors execute the program instructions to:

identify a set of microservices in a sequence of microservices preceding a preselected microservice in the sequence of microservices;

identify each tracing data sample received from the set of microservices preceding the preselected microservice in the sequence of microservices; and delete each tracing data sample corresponding to a set of selected transactions received from the set of microservices preceding the preselected microservice in the sequence of microservices that was dropped during rate-limiting sampling performed by the preselected microservice based on analysis of a result of the rate-limiting sampling of the set of selected transactions received from the preselected microservice thereby retaining a subset of tracing data samples corresponding to the set of selected transactions collected during head-based sampling.

9. The computer system of claim 8, wherein the set of processors further executes the program instructions to:

perform, using a tracing agent located in the preselected microservice of the sequence of microservices, the rate-limiting sampling of the set of selected transactions in accordance with a selected rate-limiting sampling rate in addition to the head-based sampling of the set of selected transactions based on the tracing agent determining that the preselected microservice was set to perform the rate-limiting sampling;

send the result of the rate-limiting sampling of the set of selected transactions to a tracing server; and perform, using the tracing server, the analysis of the result of the rate-limiting sampling of the set of selected transactions performed by the tracing agent located in the preselected microservice of the sequence of microservices.

10. The computer system of claim 8, wherein the set of processors further executes the program instructions to:

set a head-based sampling rate in an ingress gateway such that the sequence of microservices processing a plurality of transactions utilize the head-based sampling rate to perform the head-based sampling on the set of selected transactions of the plurality of transactions.

11. The computer system of claim 8, wherein the set of processors further executes the program instructions to:

set the preselected microservice in the sequence of microservices to perform the rate-limiting sampling in addition to the head-based sampling on the set of selected transactions of a plurality of transactions.

12. The computer system of claim 8, wherein the set of processors further executes the program instructions to:

receive, using an ingress gateway, a plurality of transaction requests corresponding to a plurality of transactions from a plurality of client devices; and select, using the ingress gateway, a set of transaction requests from the plurality of transaction requests based on a head-based sampling rate set in the ingress gateway.

13. The computer system of claim 8, wherein the set of processors further executes the program instructions to:

insert, using an ingress gateway, a head-based sampling label in a header of each respective transaction request of a set of transaction requests that were selected from a plurality of transaction requests based on a head-based sampling rate set in the ingress gateway; and send, using a plurality of network proxies, the plurality of transaction requests to each respective microservice of the sequence of microservices in sequential order to process the plurality of transaction requests corresponding to a plurality of transactions.

14. A computer program product for enhanced distributed tracing, the computer program product comprising one or more computer-readable storage media having program instructions collectively stored therein, the program instructions executable by one or more processors to cause the one or more processors to:

identify a set of microservices in a sequence of microservices preceding a preselected microservice in the sequence of microservices;

identify each tracing data sample received from the set of microservices preceding the preselected microservice in the sequence of microservices; and delete each tracing data sample corresponding to a set of selected transactions received from the set of microservices preceding the preselected microservice in the sequence of microservices that was dropped during rate-limiting sampling performed by the preselected microservice based on analysis of a result of the rate-limiting sampling of the set of selected transactions received from the preselected microservice thereby retaining a subset of tracing data samples corresponding to the set of selected transactions collected during head-based sampling.

15. The computer program product of claim 14, wherein the program instructions further cause the one or more processors to:

perform, using a tracing agent located in the preselected microservice of the sequence of microservices, the rate-limiting sampling of the set of selected transactions in accordance with a selected rate-limiting sampling rate in addition to the head-based sampling of the set of selected transactions based on the tracing agent determining that the preselected microservice was set to perform the rate-limiting sampling;

send the result of the rate-limiting sampling of the set of selected transactions to a tracing server; and perform, using the tracing server, the analysis of the result of the rate-limiting sampling of the set of selected transactions performed by the tracing agent located in the preselected microservice of the sequence of microservices.

16. The computer program product of claim 14, wherein the program instructions further cause the one or more processors to:

set a head-based sampling rate in an ingress gateway such that the sequence of microservices processing a plurality of transactions utilize the head-based sampling rate to perform the head-based sampling on the set of selected transactions of the plurality of transactions.

17. The computer program product of claim 14, wherein the program instructions further cause the one or more processors to:

set the preselected microservice in the sequence of microservices to perform the rate-limiting sampling in addition to the head-based sampling on the set of selected transactions of a plurality of transactions.

18. The computer program product of claim 14, wherein the program instructions further cause the one or more processors to:

receive, using an ingress gateway, a plurality of transaction requests corresponding to a plurality of transactions from a plurality of client devices; and select, using the ingress gateway, a set of transaction requests from the plurality of transaction requests based on a head-based sampling rate set in the ingress gateway.

19. The computer program product of claim 14, wherein the program instructions further cause the one or more processors to:

insert, using an ingress gateway, a head-based sampling label in a header of each respective transaction request of a set of transaction requests that were selected from a plurality of transaction requests based on a head-based sampling rate set in the ingress gateway; and send, using a plurality of network proxies, the plurality of transaction requests to each respective microservice of the sequence of microservices in sequential order to process the plurality of transaction requests corresponding to a plurality of transactions.

20. The computer program product of claim 14, wherein the program instructions further cause the one or more processors to:

utilize a tracing agent located in each respective microservice of the sequence of microservices to collect tracing data samples corresponding to the set of selected transactions in accordance with the head-based sampling based on identifying a head-based sampling label inserted in a header of a set of transaction requests corresponding to the set of selected transactions; and send, using the tracing agent located in each respective microservice of the sequence of microservices, the tracing data samples corresponding to the set of selected transactions that were collected in accordance with the head-based sampling to a tracing server.

* * * * *